(12) United States Patent
Kjar

(10) Patent No.: US 11,184,379 B1
(45) Date of Patent: Nov. 23, 2021

(54) FILE SCANNER TO DETECT MALICIOUS ELECTRONIC FILES

(71) Applicant: United Services Automobile Association, San Antonio, TX (US)

(72) Inventor: Joseph Andrew Kjar, Boerne, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 309 days.

(21) Appl. No.: 16/355,182

(22) Filed: Mar. 15, 2019

Related U.S. Application Data

(60) Provisional application No. 62/644,041, filed on Mar. 16, 2018.

(51) Int. Cl.
| | |
|---|---|
| *H04L 29/06* | (2006.01) |
| *G06F 21/56* | (2013.01) |
| *H04L 12/58* | (2006.01) |

(52) U.S. Cl.
CPC ........ *H04L 63/1425* (2013.01); *G06F 21/563* (2013.01); *G06F 21/565* (2013.01); *H04L 51/12* (2013.01); *H04L 63/0245* (2013.01); *H04L 63/145* (2013.01); *H04L 63/1483* (2013.01)

(58) Field of Classification Search
CPC ..... H04L 29/06; H04L 63/1425; H04L 51/12; H04L 63/0245; H04L 63/145; H04L 63/1483; G06F 21/56; G06F 21/563; G06F 21/565
See application file for complete search history.

(56) References Cited

U.S. PATENT DOCUMENTS

| | | | |
|---|---|---|---|
| 8,695,096 B1* | 4/2014 | Zhang | G06F 21/564 726/24 |
| 9,027,140 B1* | 5/2015 | Watkins | G06F 21/56 726/24 |
| 10,523,609 B1* | 12/2019 | Subramanian | H04L 63/1416 |
| 2009/0150999 A1* | 6/2009 | Dewey | G06F 21/56 726/24 |
| 2013/0067577 A1* | 3/2013 | Turbin | G06F 21/56 726/24 |

* cited by examiner

*Primary Examiner* — Jayesh M Jhaveri
(74) *Attorney, Agent, or Firm* — BakerHostetler

(57) ABSTRACT

Disclosed herein are embodiments of systems, methods, and products comprising an analytic server, which automatically detects malicious electronic files. The analytic server receives electronic files, runs a file extraction module to recursively scan the electronic files, and extracts all of the embedded and linked electronic files. The analytic server runs an exploit scanner against the extracted electronic files, and extracts code included in the electronic files. The analytic server deobfuscates the extracted code and examines the deobfuscated code by applying a set of malicious behavior rules against the deobfuscated rules. The analytic server identifies potentially malicious electronic files based on the examination. The analytic server applies a set of whitelist rules on the potentially malicious electronic files to eliminate false alarms. The analytic server transmits alert notifications to an analyst regarding the malicious electronic files and updates the whitelist rules based on analyst's feedback.

10 Claims, 8 Drawing Sheets

FILE SCANNER TO DETECT MALICIOUS ELECTRONIC FILES

CROSS-REFERENCE TO RELATED APPLICATIONS

This application claims priority to U.S. Provisional Patent Application Ser. No. 62/644,041, entitled "File Scanner," filed Mar. 16, 2018, which is hereby incorporated by reference in its entirety.

TECHNICAL FIELD

This application relates generally to methods and systems for detecting malicious electronic files.

BACKGROUND

The use of the Internet has rapidly increased, and organizations are becoming more reliant upon Internet technologies to operate business. However, the use of the Internet may expose users to security threats. For example, in phishing attacks, the attackers may send emails and/or other electronic messages to a user with malicious electronic files contained in the electronic messages. The malicious electronic files may have viruses and other payloads designed to compromise the user's private network. Specifically, the malicious electronic files may contain links to websites hosting malicious software (known as malware). The malicious electronic files may also include executable code, scripts, and other hostile software that may damage the user device and infect other devices. Detecting the malicious electronic files is important to prevent malicious attacks.

The conventional methods for detecting malicious electronic files may only look on the surface of files and rely too heavily on the results of sandboxing to determine whether the files contain malicious components. The sandbox is a security mechanism that executes untested or untrusted programs or code, possibly from unverified or untrusted third parties, suppliers, users or websites in a restricted operating system environment. Some conventional scanning methods may use a sandbox to allow the code in the received message to run and look for suspicious behavior. In addition to sandboxing, most scanners will also use static analysis to perform a cursory examination of the file's contents. However, the existing and conventional methods may not adequately take into account the intricacies of specific formats and abuse by attackers. For example, sophisticated malicious code may refuse to run when initiated by a scanner, allowing the malware to appear benign. Attackers may change their tactics and use more covert methods to deploy attacks and penetrate networks, and such attacks may be new and previously unknown. As a result, the attacks may be sophisticated and difficult to stop when using traditional anti-spam software and appliances. Such attacks may lie undetected until damage occurs. Thus, the conventional methods may fail to provide adequate protection.

SUMMARY

For the aforementioned reasons, there is a need for an improved malicious electronic file detection system that is more effective and efficient. Discussed herein are systems and methods for scanning a first set of electronic files and extracting all linked and embedded electronic files within the first set of electronic files, scanning the electronic file contents and extracting code included in each of the electronic files; deobfuscating the code by removing all command string concatenations, examining the deobfuscated codes by applying malicious behavior rules against the electronic file contents, identifying potentially malicious electronic files based on the examination, eliminating false alarms by applying whitelist rules against the potentially malicious electronic files, generating and transmitting alerts of malicious electronic files to an analyst, and updating the rules based on the analyst's feedback and new knowledge of malicious behaviors.

In one embodiment, a method comprises intercepting, by a server, an electronic message configured to be transmitted from a first computer to a second computer within a private network, the electronic message comprising a first electronic file; scanning, by the server, the electronic message in accordance with a first set of iterative scanning criteria and a second set of iterative scanning criteria, the first set of iterative scanning criteria comprising: identifying, by the server, an object interface embedded within or linked to the first electronic file; extracting, by the server, a second electronic file corresponding to the object interface, wherein the server iteratively performs the first set of iterative scanning so that a number of iterations corresponds to a number of electronic files identified that are linked to or embedded within the first electronic file; the second set of iterative scanning criteria comprising: extracting, by the server, a first set of code corresponding to the first electronic file and a second set of code corresponding to the second electronic file; deobfuscating, by the server, the first and second sets of code by removing command string concatenations and decoding encoded strings, examining, by the server, the first and second deobfuscated sets of code by applying malicious behavior rules against the first and second deobfuscated sets of code while restricting the first and second sets of code being executed on the second computer or the server; and upon determining the first and second deobfuscated code containing contents that match the malicious behavior rules, transmitting, by the server, the electronic files to a malware repository.

In another embodiment, a method comprises applying, by a server, a set of whitelist rules against one or more potentially malicious electronic files, wherein the set of whitelist rules comprise rules for benign electronic files defining file name, regular expression of file title, and a file content feature; upon determining a subset of potentially malicious documents match the set of whitelist rules, determining, by the server, the subset of potentially malicious electronic files matching the set of whitelist rules are benign electronic files, and the rest of potentially malicious electronic files are malicious electronic files; generating and transmitting, by the server, alert notifications of the malicious electronic files to a computing device operated by an analyst; receiving, by the server, a request from the computing device operated by the analyst when the analyst determines the alert notifications are false alarms and the malicious electronic files are benign, wherein the analyst requests the server to eliminate the false alarms; determining, by the server, new whitelist rules for the benign electronic files by exploring criteria, features, and patterns shared by the benign electronic files; and updating, by the server, a database configured to store the set of whitelist rules by adding the new whitelist rules.

It is to be understood that both the foregoing general description and the following detailed description are exemplary and explanatory and are intended to provide further explanation of the disclosed embodiment and subject matter as claimed.

BRIEF DESCRIPTION OF THE DRAWINGS

The accompanying drawings constitute a part of this specification and illustrate embodiments of the subject matter disclosed herein.

FIG. 4 illustrates an example of alert notification, according to an embodiment.

FIG. 8 illustrates an example of managing the security information and event, according to an embodiment.

DETAILED DESCRIPTION

Figure 1:
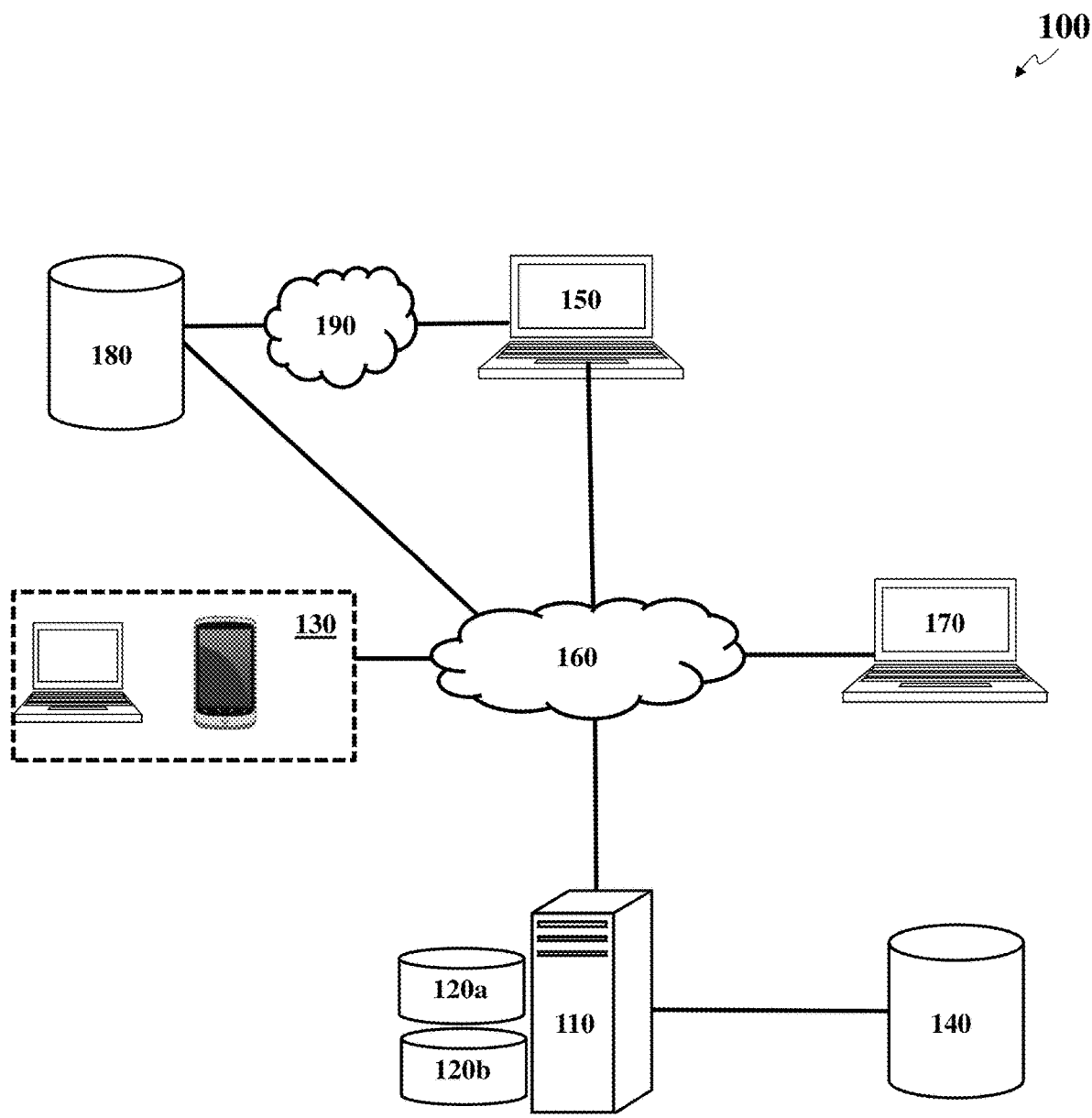
FIG. 1 illustrates a computer system for detecting malicious electronic files, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

FIG. 1 illustrates components of a system 100 for detecting malicious electronic files, according to an embodiment. The system 100 may comprise a malware repository 140, a set of electronic devices 130 sending electronic messages to a receiving device 170, an analytic server 110, and an analyst-computing device 150, which are connected with each other via hardware and software components of one or more networks 160. Further, the analytic server 110 may comprise or may be in network-communication with a malicious behavior database 120a and a whitelist database 120b. Examples of the network 160 include, but are not limited to, Local Area Network (LAN), Wireless Local Area Network (WLAN), Metropolitan Area Network (MAN), Wide Area Network (WAN), and the Internet. The communication over the network 160 may be performed in accordance with various communication protocols, such as Transmission Control Protocol and Internet Protocol (TCP/IP), User Datagram Protocol (UDP), and IEEE communication protocols.

The set of electronic devices 130 and receiving device 170 may be any computing device comprising a processor, memory, power resources, and network connectivity. The examples of the set of electronic devices 130 and receiving device 170 may include, but are not limited to, a desktop computer, a laptop, a personal digital assistant (PDA), a smartphone, a tablet computer, and the like. The electronic devices 130 may send electronic messages to the receiving device 170 via the network 160. In one or more embodiments, the electronic devices 130 may be devices operated by malicious attackers. The receiving device 170 may be a device within a private network. For example, a malicious attacker may use the electronic devices 130 to send an email message to a receiving device 170 associated with an employee of a company or organization. The email message may comprise malicious documents trying to compromise the private network of the company or organization.

The analytic server 110 may be any computing device comprising a processor and other computing hardware and software components, configured to examine the electronic traffic (e.g., electronic messages) from different electronic devices 130 to the receiving device 170, protect the receiving device 170 and the receiving device's private network, and detect malicious electronic files embedded within the electronic traffic. The analytic server 110 may be logically and physically organized within the same or different devices or structures, and may be distributed across any number of physical structures and locations (e.g., cabinets, room, buildings, and cities).

The analytic server 110 may intercept the electronic message to the receiving device 170 from different sources, and scan the electronic message to extract electronic files embedded within the electronic message. For example, the analytic server 110 may receive an email message addressed to the receiving device 170. The analytic server 110 may run an object linking and embedding (OLE) scanner against the email message to extract the attached, embedded, or link electronic files. Further, the analytic server 110 may iteratively scan the extracted electronic file until no deeper level electronic files are identified.

After the analytic server 110 extracts all the electronic files embedded within the electronic message, the analytic server 110 may run an exploit scanner to scan the electronic file contents. Instead of only looking for code in a portion of the electronic files that typically contains code, the analytic server 110 may run the exploit scanner against the electronic files from beginning to end to identify and extract all the code scattered throughout the electronic files.

In addition, the analytic server 110 may check the extracted code for obfuscation. Attackers may try to bypass scanners and detection tools by obfuscating malicious code so that the malicious code is not recognizable. The analytic server 110 may use deobfuscation functions to remove the command string concatenations and clean up the code.

The analytic server 110 may examine the deobfuscated code by applying a set of malicious behavior rules to the code. The malicious behavior rules (e.g., Yara rules) may be rules stored in the malicious behavior database 120a defining malicious Boolean expressions of conditions for malicious software detection. The analytic server 110 may query the malicious behavior database 120a to retrieve the malicious behavior rules and check if any of the malicious behavior rules applies to the deobfuscated extracted code.

The malicious behavior database 120a may be any non-transitory machine-readable media configured to store data. The malicious behavior database 120a may include rules defining malicious functions or operations under different scenarios. For example, the rules (e.g., Yara rules) may define certain strings or patterns found in an electronic file, a specific file type in a certain document, specific executable code, or functions in a certain electronic file. Examples of the malicious behavior rules include, but are not limited to, an office document containing ".Run(," "Shell," or ".Exec(," a RAR file containing a .js file, a ZIP archive containing a .hta file, a PDF document containing hidden scripts, an office document containing references to code libraries (e.g. DLLs) or API functions, and an office document containing suspicious files encapsulated using object linking and embedding (OLE). With the evolution of the malicious attacks, the analyst may update the malicious behavior database 120a with new rules based on new knowledge on the malicious attack behaviors.

The analytic server 110 may also apply a set of whitelist rules stored in the whitelist database 120b to the potentially malicious electronic files. The whitelist database 120b may be any non-transitory machine-readable media configured to store data. The whitelist database 120b may include rules for benign electronic files that may exhibit suspicious behavior. For example, a bank document may include strings that look suspicious. The analytic server 110 may mark such a benign bank document as potentially malicious based on the malicious behavior rules. The whitelist rules may explore the features of such benign electronic files, so that the analytic server 110 may be able to recognize the benign electronic files based on the whitelist rules and eliminate false alarms. The whitelist database 120b may include different rules on different features on the benign electronic files. For example, the whitelist database 120b may include rules defining file names, expression of file titles, or content features of benign electronic files.

The analytic server 110 may query the whitelist rules from the whitelist database 120b and examine the electronic files including the file names, file titles, and file contents, and check if any of the whitelist rules from the whitelist database 120b applies to the electronic file contents. Alternatively, the analytic server 110 may check if the electronic file contents satisfy any of the conditions defined in the whitelist rule. If any rule applies or the contents satisfy any condition, the analytic server 110 may determine that the electronic file is not malicious even though the electronic file looks suspicious based on the malicious behavior rules.

After the analytic server 110 filters out the benign electronic files from the potentially malicious electronic files, the analytic server 110 may determine whether the remainder of the potentially malicious electronic files are truly malicious and trigger an alert notification for each malicious electronic file. The alert notification may comprise information on alert identifier, the electronic file name, the file path, the malicious code, the applied malicious behavior rules, and any other related information. The analytic server 110 may transmit the alert notification to an analyst-computing device 150.

The analyst-computing device 150 may be any computing device comprising a processor and non-transitory machine-readable storage medium allowing an analyst to interact with the analytic server 110, examine the malicious electronic files and provide manual intervention on the identified malicious electronic files. The examples of the analyst-computing device 150 may include, but are not limited to, a desktop computer, a laptop, a personal digital assistant (PDA), a smartphone, a tablet computer, and the like.

A security information and event management (SIEM) 180 system may be configured to communicate with the analytics server 110 through one or more networks 160, using wired and/or wireless communication capabilities. The analyst-computing device 150 may execute an Internet browser or local application that interacts with the SIEM 180 over a network 190. The network 190 and the network 160 may be the same network or different networks. The analyst-computing device 150 may transmit credentials from user inputs to the SIEM 180, from which the SIEM 180 may authenticate the analyst and/or determine a user's role. If the analyst is a new user who has not registered, the analyst-computing device 150 may transmit registration requests to the SIEM 180. The registration requests may include the analyst's identification information and other information that is required by the SIEM 180 for new user registration. The SIEM 180 may generate an account for the analyst and save the analyst's identification information and other required information to a profile database. The analyst-computing device 150 may comprise any number of input devices configured to receive any number of data inputs, including various types of data inputs allowing for authentication (e.g. username, password, certificates, and biometrics).

The analyst-computing device 150 may be configured to communicate with the analytic server 110 and the SIEM 180 through one or more networks 160 and 190, using wired and/or wireless communication capabilities. In operation, the analyst-computing device 150 may use the SIEM 180, which may include a graphical user interface (GUI) that renders an interactive layout, schematic, or other elements, in order to input a request to the analytics server 110. In some embodiments, the analytic server 110 may generate console output including the alert notification and render the results on the analyst-computing device 150 or forward the results to the SIEM 180. The console application may include one or more interactive components that allow the analyst to perform various operations on the identified malicious electronic files. In some embodiments, the analyst may mitigate the damages of the malicious electronic files. In some other embodiments, the analyst may find certain electronic files are not malicious. The analyst may interact with the one or more interactive components of the STEM 180 or console application and submit a request to the analytic server 110. The request may require the analytic server 110 to update the whitelist database 120b to include new whitelist rules and remove the false alarms on such benign electronic files. The analytic server 110 may update the whitelist database 120b with new whitelist rules based on patterns shared by the benign electronic files.

In some embodiments, the analyst may not have enough information regarding the malicious electronic files and may not be able to determine a proper action without further investigating the electronic files. The analytic server 110 may receive an indication (from the analyst computing device 150 that a malicious electronic file needs further investigation. For example, an analyst operating the analyst-computing device 150 may interact with a console application on the analytic server 110 and displayed on the analyst-computing device 150 in order to transmit a notification to the analytic server 110 that a more detailed investigation may be needed. The request to the analytic server 110 may include multiple inputs or parameters in order to configure the behavior of the analytic server. After receiving an investigation request from the analyst-computing device 150, the analytic server 110 may upload the electronic message including the malicious electronic files into a malware repository 140.

The malware repository 140 may be a storage location that contains various software packages and allows different files to be executed without affecting the primary network (e.g., network 160). The network 160 may enforce isolation rules to allow the analytics server 110 to upload files to the malware repository 140, but prevent connections from other devices on the network 160 so that any malware included in the malware repository 140 may not infect other devices connected to the network 160. From the malware repository 140, an instance of the analytic server 110 may download the malicious electronic files and examine the untrusted programs or code, and present the results to the analyst-computing device 150. By allowing the code in the malicious electronic files to execute, the analyst operating the analyst-computing device 150 may be able to determine the malicious behaviors and damaging activities of the malicious electronic files. As a result, the analyst may be able to gain enough knowledge to determine the proper actions on such malicious electronic files.

Figure 2:
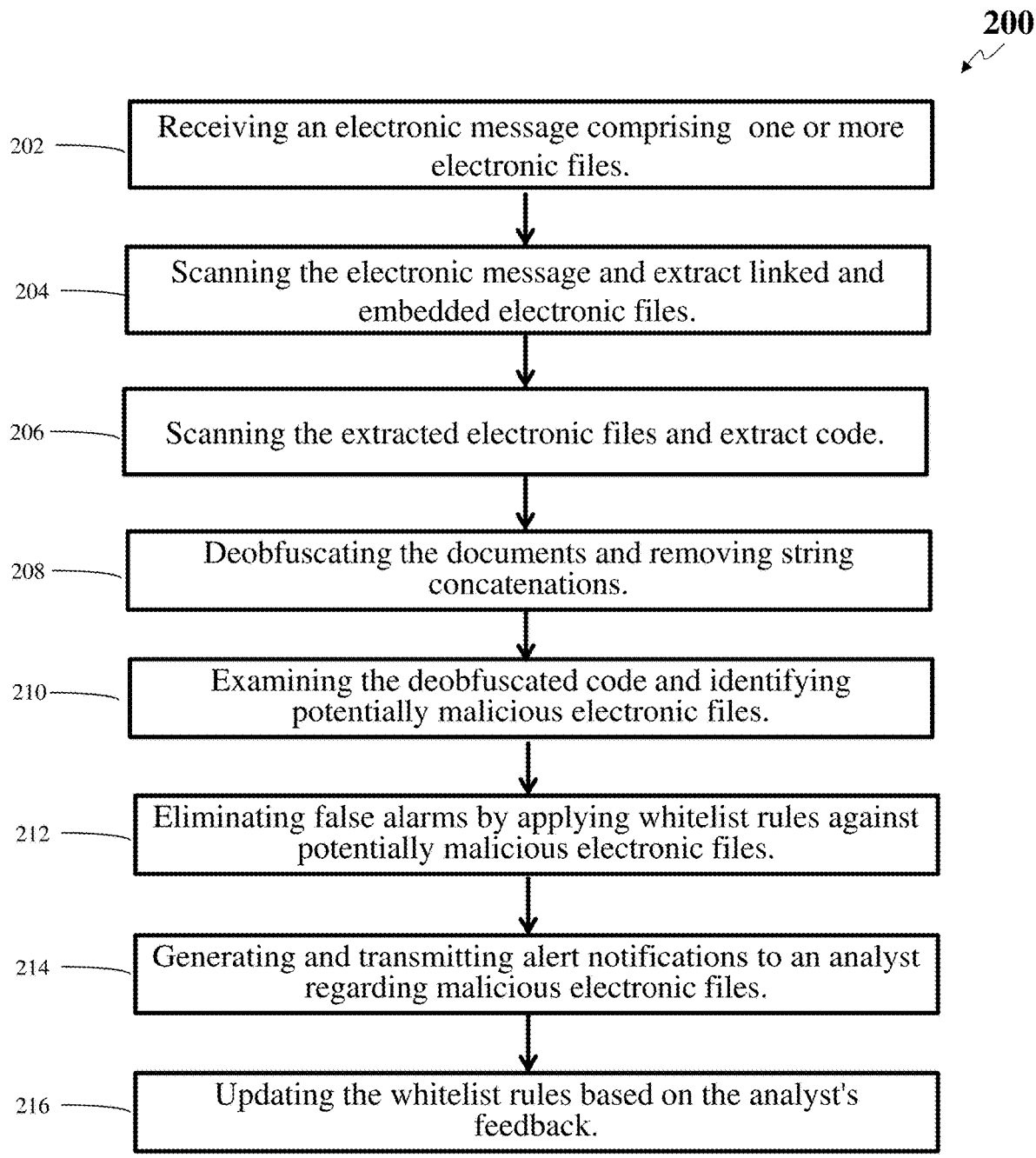
FIG. 2 illustrates a flowchart depicting operational steps for detecting malicious electronic files, according to an embodiment.

FIG. 2 illustrates execution of a method 200 for detecting malicious electronic files, according to an embodiment. One having ordinary skill in the art would appreciate that other embodiments may comprise additional or alternative steps, or may omit some steps altogether.

At step 202, the analytic server may receive an electronic message comprising one or more electronic files. For example, the analytic server may intercept an email message addressed to a receiving device within a private network. To protect the receiving device and the private network, the analytic server may examine the email message and all of the electronic files attached to, embedded within, or linked to the email message. In some embodiment, the analytic server may receive electronic files, other than email attachment, that come into the private network. In some other embodiments, the analytic server may scan electronic files stored in a computer connected to the network. For example, the analytic server may scan the electronic files in the hard drive or other storage devices of the computer.

At step 204, the analytic server may use a file extraction module to detect and extract linked and embedded electronic files. The email message may contain attached electronic files or contain object interfaces, such as URL (uniform resource locator) addresses or any other link addresses that link to electronic files. Additionally, the attachments or linked files may contain electronic files nested within them using a variety of embedding techniques. These embedding techniques include, but are not limited to, compressed archives (e.g., .ZIP), encoded attachments (.ICS), and Object Linking and Embedding (OLE). The analytic device may run a file extraction module against the electronic message to determine any nesting techniques in use and extract the electronic file attached, embedded within, or linked to the electronic message. Further, the analytic server may run the file extraction module against the extracted electronic file to identify a next-level electronic file embedded within or linked to the extracted electronic files. If the analytic server finds a next-level electronic file, the analytic server may extract the next-level electronic file and iteratively scan the identified electronic file of next level until no deeper level of electronic files are embedded or linked. As a result, the analytic server may extract all electronic files embedded within the electronic message regardless of how deeply they are embedded or linked.

At step 206, the analytic server may scan the extracted electronic file contents with the exploit scanner and extract code. The exploit scanner may perform analysis to determine if any extracted code, such as office macros, is malicious. Macros are essentially bits of computer code, and historically they have been vehicles for malware. Microsoft® Office documents (e.g., Word, Excel, PowerPoint, and other types of documents) can contain embedded code written in a programming language known as Visual Basic for Applications (VBA). Macros allow users to automate repetitive tasks. However, malware authors write VBA code to create macros that do harmful things, and embed these macros in office documents and distribute them online. In other words, attackers may leverage malicious script code (e.g., macros) to infect user devices. The traditional detection systems may only look for evil code in a portion of the electronic file that typically contains code, such as vbaproject.bin, where all the code is stored for macros. However, a smart attacker may scatter the code throughout the rest of the electronic file. The attacker may create references to pull the different pieces of code out of different parts of the electronic file and assemble the code. The traditional detection methods and systems may not be able to detect such attacks. The analytic server may run the exploit scanner against the electronic files from beginning to end to identify and extract all the code scattered throughout the electronic files.

At step 208, the analytic server may deobfuscate the extracted code and remove command string concatenations. Obfuscation is a common technique used by attackers to obscure the intended meaning of code by making the code difficult to understand. Attackers may try to bypass scanners and other detection tools by obfuscating the code so that the code is not recognizable as malicious. For example, attackers may obfuscate the code by inserting command strings such as white space or performing exclusive-or (XOR) operations or other similar operations. The analytic server may run the exploit scanner with deobfuscation functions to clean up the code. For example, the analytic server may remove the white space by searching and replacing the white spaces with nothing and revert the exclusive-or operation. The analytic server may reconstruct the original code string by deobfuscating the code.

At step 210, the analytic server may examine the deobfuscated code and identify potentially malicious electronic files. The analytic server may send the deobfuscated code to the exploit scanner for a second time. The analytic server may examine the extracted code after deobfuscation by applying a set of malicious behavior rules against the code. In some embodiments, the analytic server may examine both the originally extracted code and the deobfuscated code against the set of malicious behavior rules. These malicious behavior rules may be simple or complex conditions for malicious software detection including, but not limited to, Boolean statements, regular expressions, and statistical measures. If any of the conditions is met, the code may be potentially malicious. The malicious behavior rules may be stored in the malicious behavior database. The analytic server may query the malicious behavior database, and examine the extracted code after deobfuscation to determine if any of the malicious behavior rules applies to the deobfuscated extracted code. In some embodiments, the analytic server may determine the code is potentially malicious when any of the malicious behavior rules applies. In some other embodiments, the analytic server may determine the code is potentially malicious when a combination of different rules applies.

In some embodiments, the analytic server may determine the risk levels of the potentially malicious electronic files based on the applied malicious behavior rules (e.g., using tags or metadata of Yara rules). The risk level may be in different categories, such as low risk, medium risk, and high risk. Alternatively, the risk level may be qualified. For example, the risk level may be in scale of 1 to 10.

At step 212, the analytic server may eliminate false alarms by applying a set of whitelist rules to the potentially malicious electronic files. The potentially malicious electronic files identified based on the malicious behavior rules may include noise and false alarms. For example, the analytic server may classify office documents containing shell execution functions and object linking and embedding (OLE) as potentially malicious. However, a benign document may contain shell execution functions and OLE for a normal purpose. To eliminate such false alarms, the analytic server may query the whitelist database configured to store rules defining file name, expression of file title, and content features of benign electronic files. The analytic server may apply the whitelist rules retrieved from the whitelist database against the identified potentially malicious electronic files. Upon determining any of the whitelist rules applies to a potentially malicious electronic file, the analytic server may determine that the electronic file is not malicious after all. After the analytic server filters out the benign electronic files that look suspicious and satisfy the conditions in the malicious behavior rules, the analytic server may determine the rest of the potentially malicious electronic files are indeed malicious. By eliminating false alarms, the analytic server may be able to identify the malicious electronic files with high fidelity, and only trigger alert notifications for the truly malicious electronic files, which may improve the system efficiency.

As discussed above, the whitelist database may include rules defining file names, expression of file titles, and content features of benign electronic files. Specifically, the whitelist rules defining file names may include a list of electronic file names that are benign electronic files. For example, the bank document looking suspicious may have a static name "account statement." The document name "account statement" may be included in the whitelist rules defining file names. When the analytic server applies the whitelist rules against the potentially malicious electronic files, the analytic server may compare the file name with the list of benign file names. Upon the comparison returns a match, the analytic server may determine the potentially malicious electronic file is actually benign.

The whitelist database may also include whitelist rules defining regular expressions (known as regexes) of file titles. The whitelist database may include a list of regexes for benign electronic file tiles. For example, a quote document looking suspicious may have a tile "Joseph's report—quote—04-08-2017." Other similar quote documents may have the same title pattern of "—quote—" followed by a date. In other words, such quote documents may have the title pattern of dash, space, the word "quote," space, dash, space, two digits, dash, two digits, dash, four digits. To explore such a feature in the title pattern, the analytic server may include a regex matching the title pattern in the whitelist rule, enabling the analytic server to determine that the electronic files whose titles match the regex are benign electronic files.

Furthermore, the whitelist database may include whitelist rules defining content features of benign electronic files. In some embodiments, the benign electronic files may not have static file names or standardized file title. In such cases, the analytic server may examine the contents and explore the content features for benign electronic files. For example, benign electronic files from a vendor may include the words "State Street" as part of the vendor's address. The whitelist rules may include a rule indicating that if an electronic file includes the words "State Street," the electronic file is not malicious. The whitelist rules may include a list of word strings for benign electronic files. Similarly, the whitelist rules may include other conditions for benign electronic files.

In some embodiments, the analytic server may look for hex strings in any part of the electronic files. A document opened in a hex editor may include a hex string that uniquely identifies the document. Different versions of the same document may share the same hex strings. To explore such a feature, the whitelist rule may include the hex string of benign electronic file of different versions.

In some other embodiments, the analytic server may examine the type of the embedded files or objects. For example, a Word document may include different embedded OLE objects of different types, such as a GIF image, a JPEG image, an ISO file, a radio file, a Photoshop file, and other objects. The whitelist rules may define features on each of the file types. The analytic server may extract each of the embedded objects and examine the object against the rules for the specific file type. For example, the analytic server may determine an object matches the whitelist rules for JPEG files. The analytic server may identify the object as a JPEG image, which is typically safe.

The whitelist rules may include other rules for object identification based on file hash. In some cases, a document may include embedded objects that are not visible to the user. The whitelist rules discussed above may not be applicable for the invisible objects. The whitelist rules may include file hashes of known good files. To identify the invisible objects, the analytic server may hash the object and compare to the file hashes of known good objects. If the comparison returns a match, the analytic server may determine that the object is benign even if the object is otherwise unidentifiable. For example, the whitelist rules may include the file hash of a blank OLE object, thus preventing blank OLE objects in future files from generating alerts. If the file hash of an invisible object matches the file hash of the blank OLE object from the whitelist rules, the analytic server may determine that the invisible object is actually a blank object and is safe.

At step 214, the analytic server may generate and transmit alert notifications to an analyst-computing device regarding the malicious electronic files. After the analytic server filters out the noise from the potentially malicious electronic files, the analytic serve may flag the rest of potentially malicious electronic files as malicious and trigger an alert notification for each malicious electronic file. In operation, the analytic server may create a security log for each malicious electronic file, and save the security logs into a repository or database, such as an ELK® database. The security log database (e.g., ELK® database) may contain the security logs for a certain amount of time. The analytic server may leverage a SIEM such as ArcSight® or Phantom® to generate the alert notifications by querying the security logs. The SIEM may aggregate or organize all of the related information for a malicious electronic file based on the corresponding security logs and perform automated actions. For example, Phantom® may examine the alert generated by the analytics server and use the alert details to automatically locate the source of the malicious file. Phantom® may then present the information from the original alert plus the results of any automated actions to the analyst-computing device in a unified view. With all the related security information presented in a single view, the analyst may be able to remediate any problems more efficiently.

In some embodiments, the analytic server may transmit the alert notifications based on the risk level of the malicious electronic files. The analytic server may only send alert notifications for malicious electronic files with a risk higher than a threshold. The threshold may be a value input or determined by an analyst or an administrative user. For example, the analytic server may send alert notifications for malicious electronic files in high risk. Alternatively, the analytic server may send alert notifications for malicious electronic files with a risk value higher than five.

The SIEM may render a graphical user interface (GUI) including the alert notification details on the analyst-computing device. By interacting with one or more interactive components included in the GUI, the analyst may be able to perform various operations. For example, the analyst may examine the code extracted by the exploit scanner and take proper actions. In some embodiments, the analyst may investigate the activity of the malicious electronic files, check the distribution of the malicious electronic files, check whether any web addresses (e.g., URL links) referenced in the malicious electronic files are linked to malware, and search and remove the malicious electronic files from affected receivers.

At step 216, the analytic server may update the whitelist rules based on analyst's feedback. This feedback may include new patterns for file names or file contents designed to prevent alerts on benign files. In some other embodiments, the analyst may find certain malicious electronic files identified by the scanners are benign. For example, the analyst may receive certain alert notifications on a regular basis. The alert notification may indicate that some electronic messages from a new vendor include malicious electronic files. While the electronic files look suspicious to the scanners, the analyst may determine these electronic files are benign and the alert notifications are false alarms. Such false alarms may happen because the whitelist rules from the whitelist database do not include corresponding rules for the electronic files from the new vendor.

In some configurations, the analyst may receive such alert notification corresponding to the benign electronic files at a rate (e.g., number of times) that satisfies a threshold value. The analyst may then communicate with the analytic server and provide feedback regarding the false alarms on the benign electronic files. For example, the analyst may submit a tuning or adjusting request to the analytic server after the analyst receives 10 false alarm alert notifications associated with the same vendor. In operation, the analyst may submit a tuning request by interacting with one or more interactive components in the GUI rendered on the analyst-computing device. After the analytic server receives such requests from the analyst, the analytic server may determine criteria, features or patterns shared by the benign electronic files, and update or tune the whitelist rules in the whitelist database to include new whitelist rules for the benign electronic files. After the updating of the whitelist rules, the analytic server may no longer trigger alert notifications on similar electronic files or files from the same vender. By adapting to new benign electronic files, the analytic server may eliminate false alarms and improve the detection efficiency. Consequently, the system may also improve the analyst's efficiency by filtering out noise and reducing the workload for the analyst.

Figure 3:
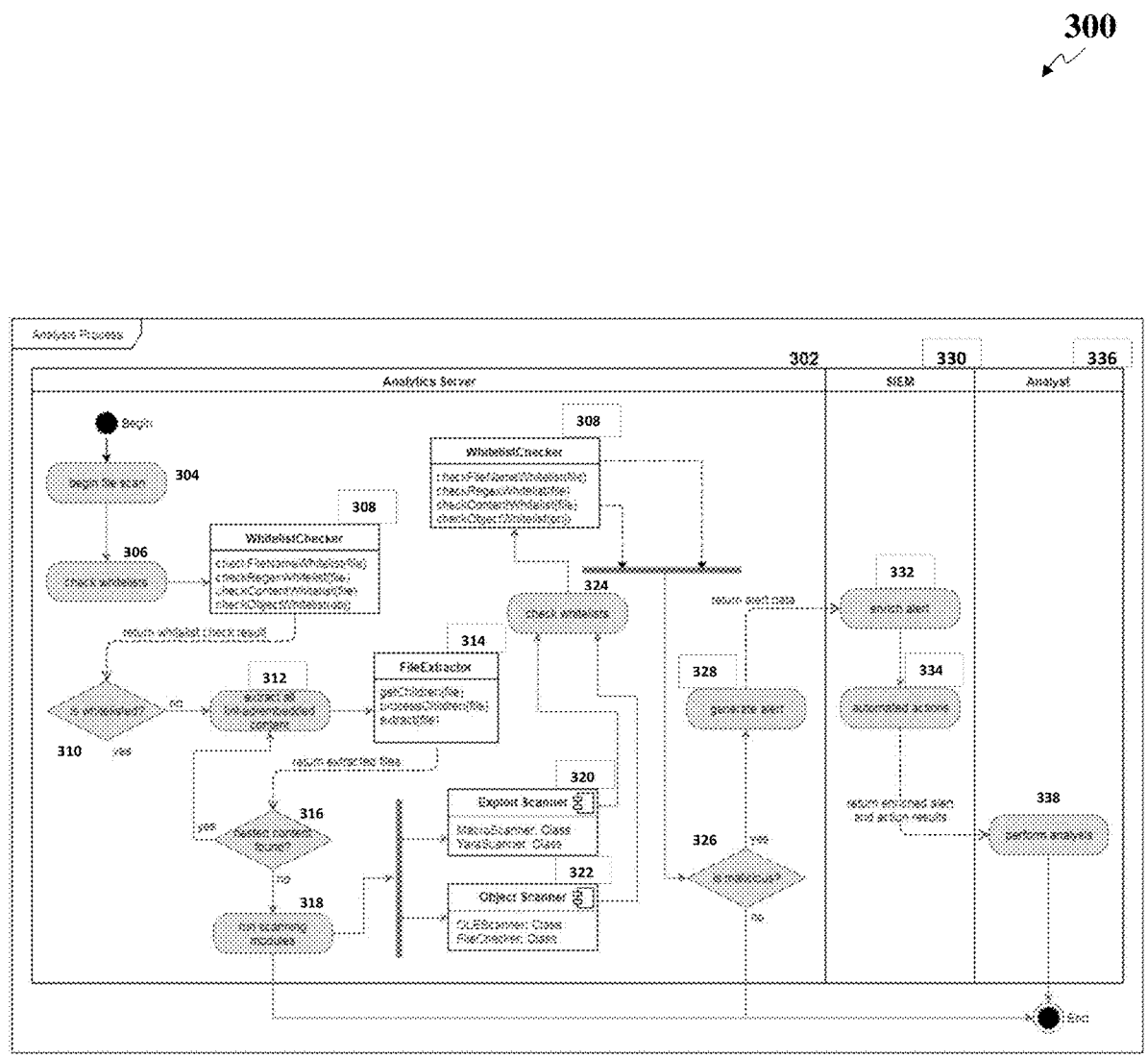
FIG. 3 illustrates an example for detecting malicious electronic files, according to an embodiment.

FIG. 3 illustrates an example for detecting malicious electronic files 300, according to an embodiment. The analytic server 302 configured to protect a private network may receive electronic files from various sources. The received electronic files may contain malicious code in an attempt to compromise the private network. The electronic files may be attachments to an email message or any other electronic files received by a receiving device on the private network. To protect the private network, the analytic server 302 may scan the electronic files (e.g., 304) and examine the electronic files against whitelists 306 by running a whitelist checker 308. The returned whitelist check result may indicate whether an electronic file is whitelisted 310. If the electronic file is not whitelisted, the analytic server 302 may extract linked and/or embedded content 312 in the electronic file by utilizing a file extraction module 314. The analytic server may check if the returned extracted files contain nested content 316, if nested content found, the process may go back to step 312 to recursively extract all embedded and linked electronic files from the received electronic files through the file extraction module 314, otherwise, the process may go to step 318 where the analytic server may run scanning modules. The scanning module may include an exploit scanner 320 and an object scanner 322. The exploit scanner 320 and object scanner 322 may scan the extracted electronic file contents and extract code from the electronic file contents. Furthermore, the exploit scanner 320 may deobfuscate the extracted code and reestablish the original code. The exploit scanner 320 may also apply a set of malicious behavior rules (e.g., Yara rules) against the deobfuscated code to identify potentially malicious electronic files. The object scanner 322 may evaluate extracted objects looking for dangerous file types (e.g. .exe, .bat, .vbs, etc.) and unrecognized file signatures. Because the potentially malicious electronic files identified based on the malicious behavior rules may include noise and false alarms, the exploit scanner 320 and object scanner 322 may leverage the whitelist checker 308 to run whitelist rules against the potentially malicious electronic files in step 324. The whitelist rules may filter out the benign electronic files that look suspicious. After the analytic server 302 filters out the noise from the potentially malicious electronic files, the analytic server 302 determine that the rest of potentially malicious electronic files are malicious 326, and flag the rest of potentially malicious electronic file as malicious and trigger an alert notification for each malicious electronic file 328. The alert notification may go through a security information and event management (SIEM) software component 330, such as Phantom, which provides real-time analysis of security alerts. The analytic server 302 may employ the SIEM 330 to aggregate or organize all of the related security information for each malicious electronic file, and generate alert notifications presenting the security information in a nice clean view to the analyst 336. For example, the SIEM 330 may enrich the alerts 332 and take some automated actions 334, and return the enriched alert and action results to the analyst 336. The analyst 336 may perform analysis 338 and examine the alert notifications and take proper actions by interacting with one or more interactive components included in the GUI rendered on the analyst-computing device.

Figure 4:
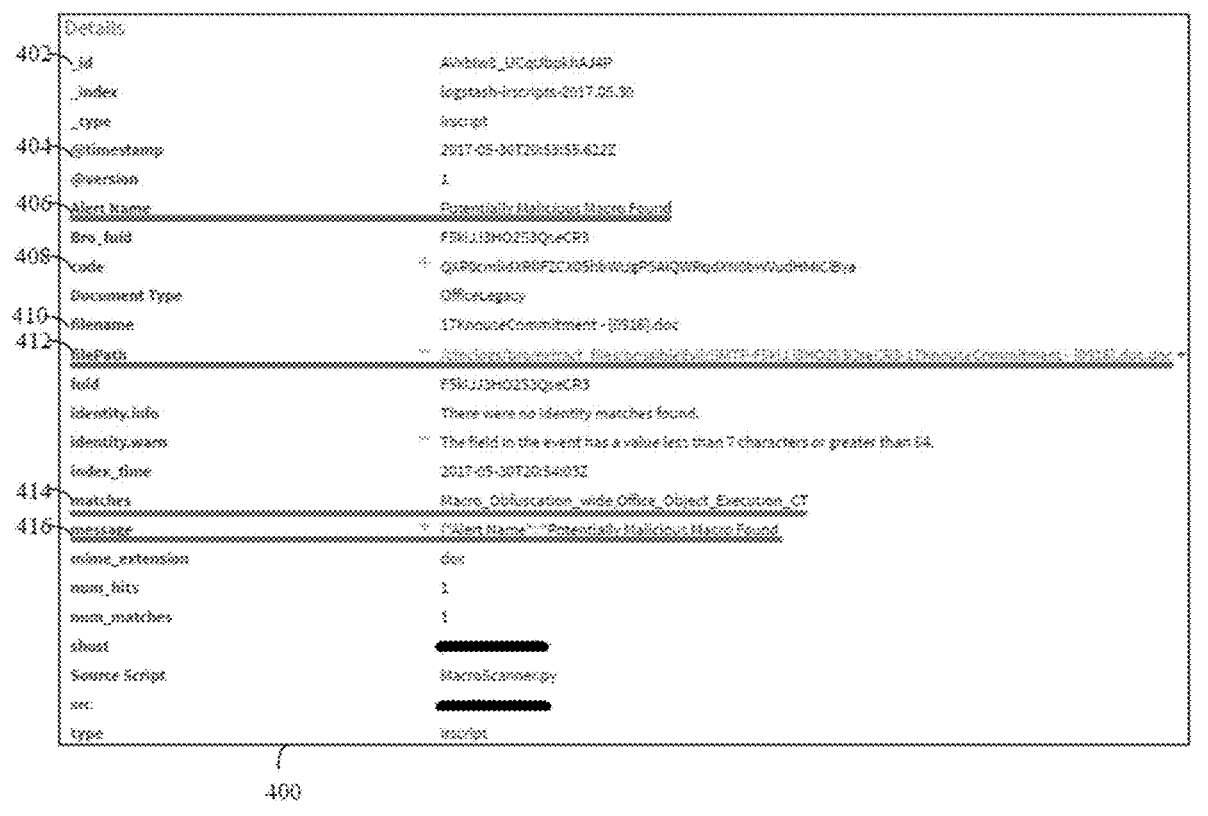

FIG. 4 illustrates an example of alert notification 400 graphical user interface, according to an embodiment. As discussed above, the analytic server may employ a security information and event management, such as Phantom to aggregate and organize all of the artifacts and any other related security information for each malicious electronic file, and generate alert notifications presenting the artifacts and security information in a nice clean view to the analyst. Specifically, the alert notification may include an alert identifier 402 that comprises a distinctive combination of numbers and characters uniquely identifying the alert notification. The alert notification may also include a timestamp 404 identifying the detection time of the malicious electronic file. The alert notification may include an alert name 406 showing the topic of the alert and the type of the alert generated by the scanner. For example, when the malicious electronic file contains malicious macros, the alert name may be "potentially malicious macro found." In another example, in which the malicious electronic file may include malicious embedded objects, the alert name may be "potentially malicious embedded objects found." The alert notification may include a code field 408 that contains the macrocode extracted from the malicious electronic file. The alert notification may include a field for filename 410 of the malicious electronic file. The alert notification may include a file path 412 that identifies the storing location of malicious electronic file in a file system. The file path 412 may point to the malicious electronic file by following the directory tree hierarchy expressed in a string of characters. The alert notification may include a field of matches 414 showing reasons for triggering the alert notification. For example, the match reasons 414 may include the applied malicious behavior rules (e.g., Yara rules) for malicious macro and a list of suspicious embedded objects included in the malicious electronic file. The alert notification may include an alert message 416 that includes full content of the alert. The analytic server may send the alert notification to an analyst in the form of email, instant message, text message, voicemail, or any other electronic messages.

When an analyst receives such an alert notification, the analyst may check the fields of filename 410, matches 414, and message 416 to learn the basic information on the malicious electronic file such as the filename and the malicious behavior rules (e.g., Yara rules) applied to the malicious electronic file. The analyst may examine the macrocode from the code field 408 for malicious behavior. In operation, the malicious behavior rules (e.g., Yara rules) rules may provide hints for the analyst regarding what malicious behavior to look for. The analyst may look for macrocode capable of referencing content stored elsewhere in the electronic file. For example, the macro may reference a malicious PowerShell command stored in a cell in a spreadsheet. The analyst may trace the malicious code referenced in other locations and determine the malicious behavior. If the analyst determines the alert notification is a false alarm and the electronic file is actually benign, the analyst may update the whitelist rules; otherwise, the analyst may take proper actions based on the malicious behavior and mitigate the damage of the malicious macrocode. For example, the analyst may check the distribution of the malicious electronic files to see how many users received it, check whether any web addresses (e.g., URL links) referenced in the malicious electronic files are linked to malware, investigate additional system activity based on executables, scripts, and other commands in the electronic file, and search and remove the malicious electronic files from affected receivers.

In some embodiments, the analyst may be unable to confirm malicious behavior based on the information in the alert notification alone. The analytic server may upload the malicious electronic file into a malware repository off network. Because the malware repository may use a secure connection and isolated network, the malware included in the repository may not infect other devices. The analyst or another senior analyst may download the malicious electronic file and execute the untrusted program or code. Based on the running results of the code, the senior analyst may determine the malicious behaviors and damaging activities of the malicious electronic file.

Figure 5:
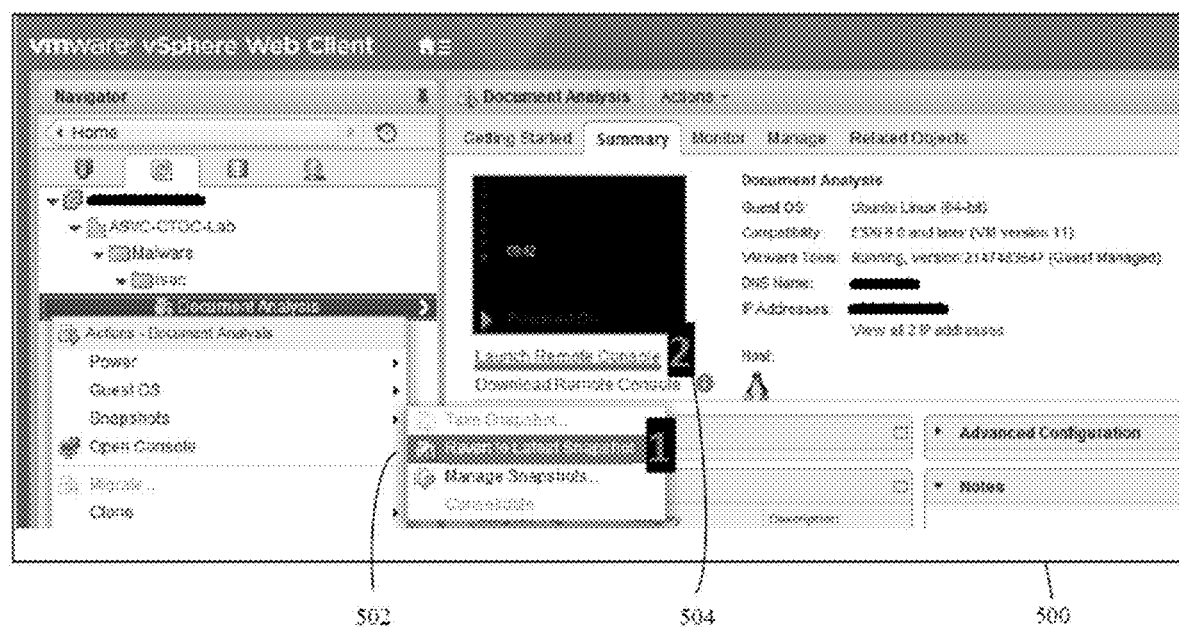
FIG. 5 illustrates an example of launching malicious behavior analysis in a malware repository, according to an embodiment.

FIG. 5 illustrates an example of performing malicious behavior analysis 500 in a malware repository, according to an embodiment. In operation, the analyst may need to log in to an electronic file analysis virtual machine by inputting user credentials (e.g., username and password). The analyst may revert to latest snapshot 502 to make sure the working environment is clean and functional. The senior analyst may also launch remote console 504 to access a virtual machine within the malware repository.

Figure 6:
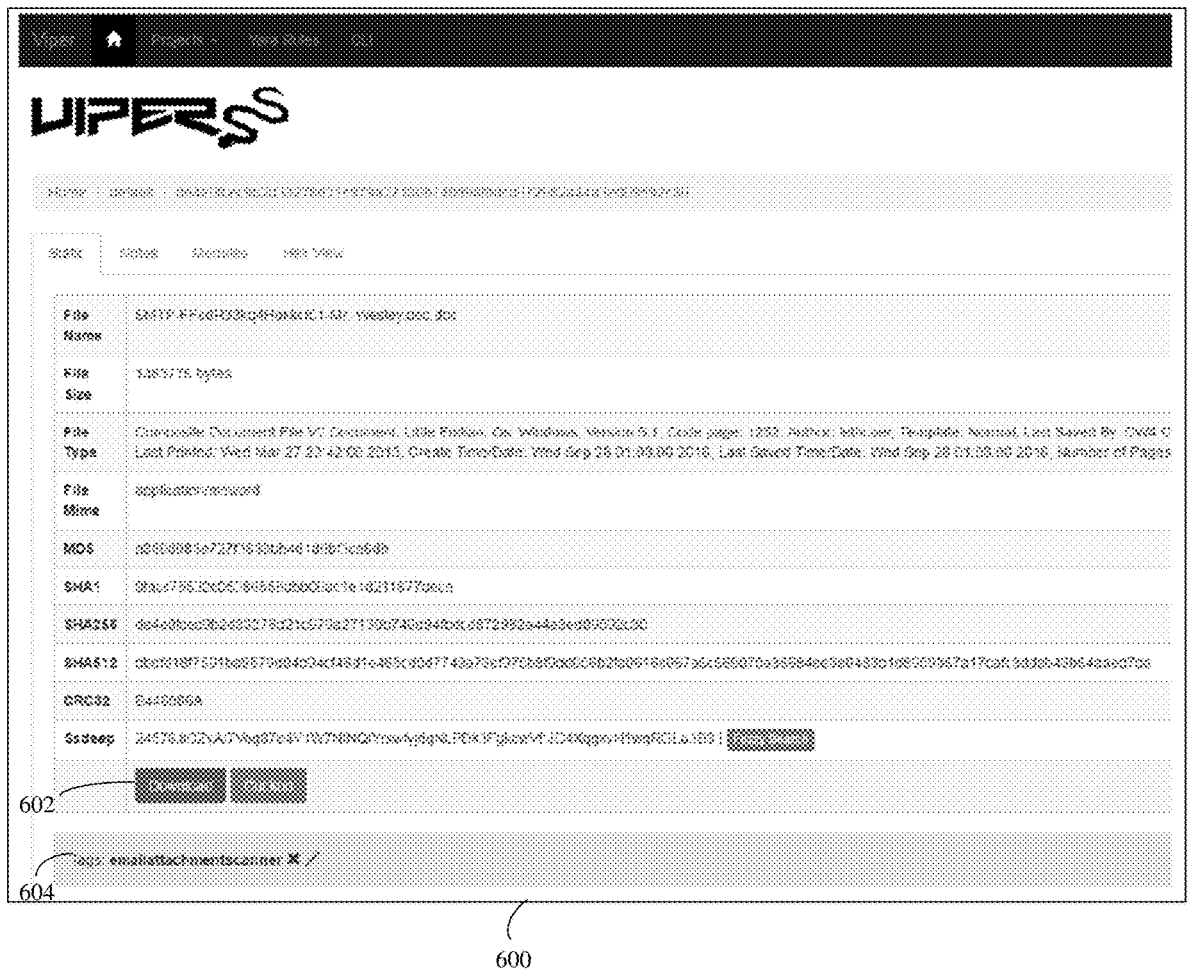
FIG. 6 illustrates an example of downloading electronic file from the malware repository, according to an embodiment.

FIG. 6 illustrates an example of downloading electronic file from the malware repository 600 graphical user interface, according to an embodiment. The analyst may launch a web browser in the virtual machine and be automatically directed to the malware repository (e.g., Viper malware repository). The analyst may located the desired file within the malware repository and download the electronic file by clicking the "download" button 602. The downloaded electronic file may have one or more tags such as "emailattachmentscanner" providing scanner and source information of the electronic file. The downloaded file may be stored in a default location, such as "putFilesHere" folder on the desktop.

Figure 7:
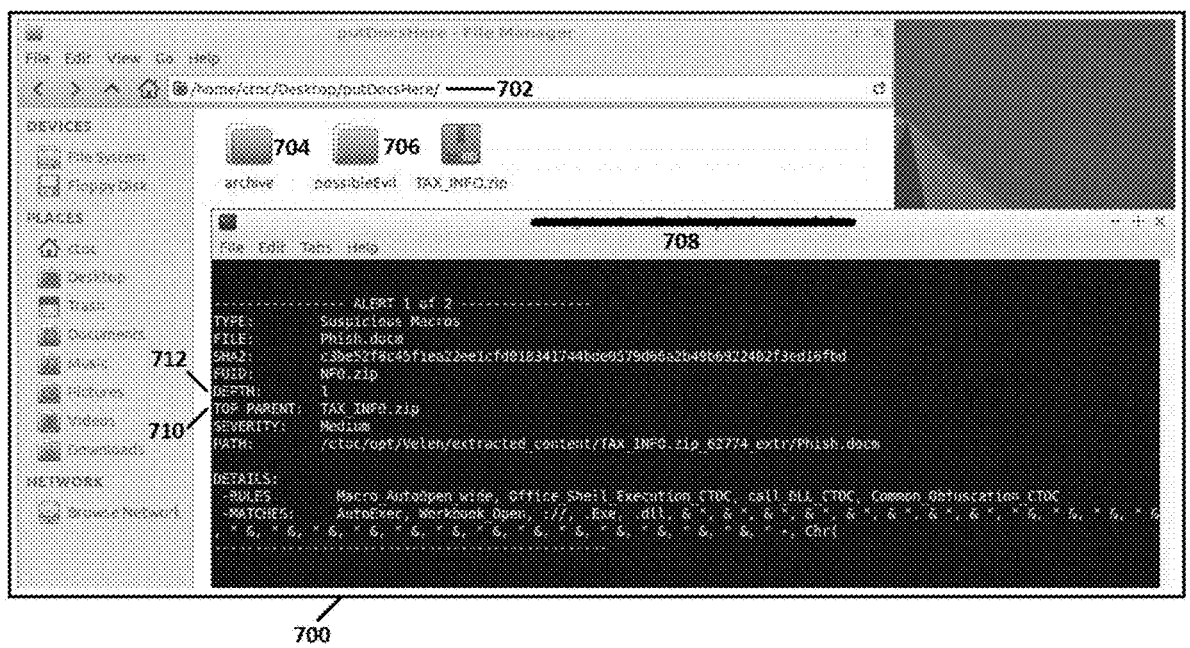
FIG. 7 illustrates an example of running the file scanner, according to an embodiment.

FIG. 7 illustrates an example of running the file scanner console interface 708 within a virtual machine 700, according to an embodiment. The default folder to be scanned may be "putDocsHere" 702. By placing multiple electronic files in the "putDocsHere" folder, the file scanner may scan the multiple electronic files at once. After scanning, the file scanner may place the files into either "archive" 704 or "possibleEvil" 706 based on the scan outcome. The file scanner may show the scan results in the console interface 708 displayed on the analyst computing device terminal. The file scanner may extract any objects embedded in the electronic file to an object folder and extract any macrocode found in the electronic file to a separate folder. If an electronic file extracted from an archive format is malicious, the scanner may record and display the relationship between the parent archive and the extracted file using the "Top Parent" 710 and "Depth" 712 fields in the alert. For example, the file scanner may receive an attachment called: "TAX_INFO.zip." The ZIP file may contain a document with malicious embedded objects or macros called: "Phish.docm." The file scanner may extract Phish.docm and scan it for malicious content. In the alert output, the scanner may indicate that Phish.docm was extracted from TAX_INFO.zip by labelling TAX_INFO.zip as the Top Parent and displaying a Depth of "1," indicating that Phish.docm was nested one level deep within the archive. The scanner may likewise extract additional files or content from Phish.docm and record and display the relationships between these extracted files and their parent files. The triggered alert notification may include information on the malicious document indicating that dangerous macros were found in Phish.docm, which was extracted from TAX_INFO.zip.

In another example, an ICS file (i.e. calendar invite used by Outlook®), "MandatoryMeeting.ics" may contain a benign Word® document, "SalaryInfo.doc" as an attachment. "SalaryInfo.doc" may contain a malicious file, "PromotionSchedule.xls" nested within it as an embedded object:

MandatoryMeeting.ics (Depth 0)
   SalaryInfo.doc (Depth 1)
   PromotionSchedule.xls (Depth 2)

The file scanner may extract the chain of files and alert on the suspicious content within PromotionSchedule.xls. The alert content may indicate that PromotionSchedule.xls is malicious, was found at Depth 2, and that its Top Parent was MandatoryMeeting.ics. After examining the series of electronic files, the analyst may take proper actions to address the threat.

Figure 8:
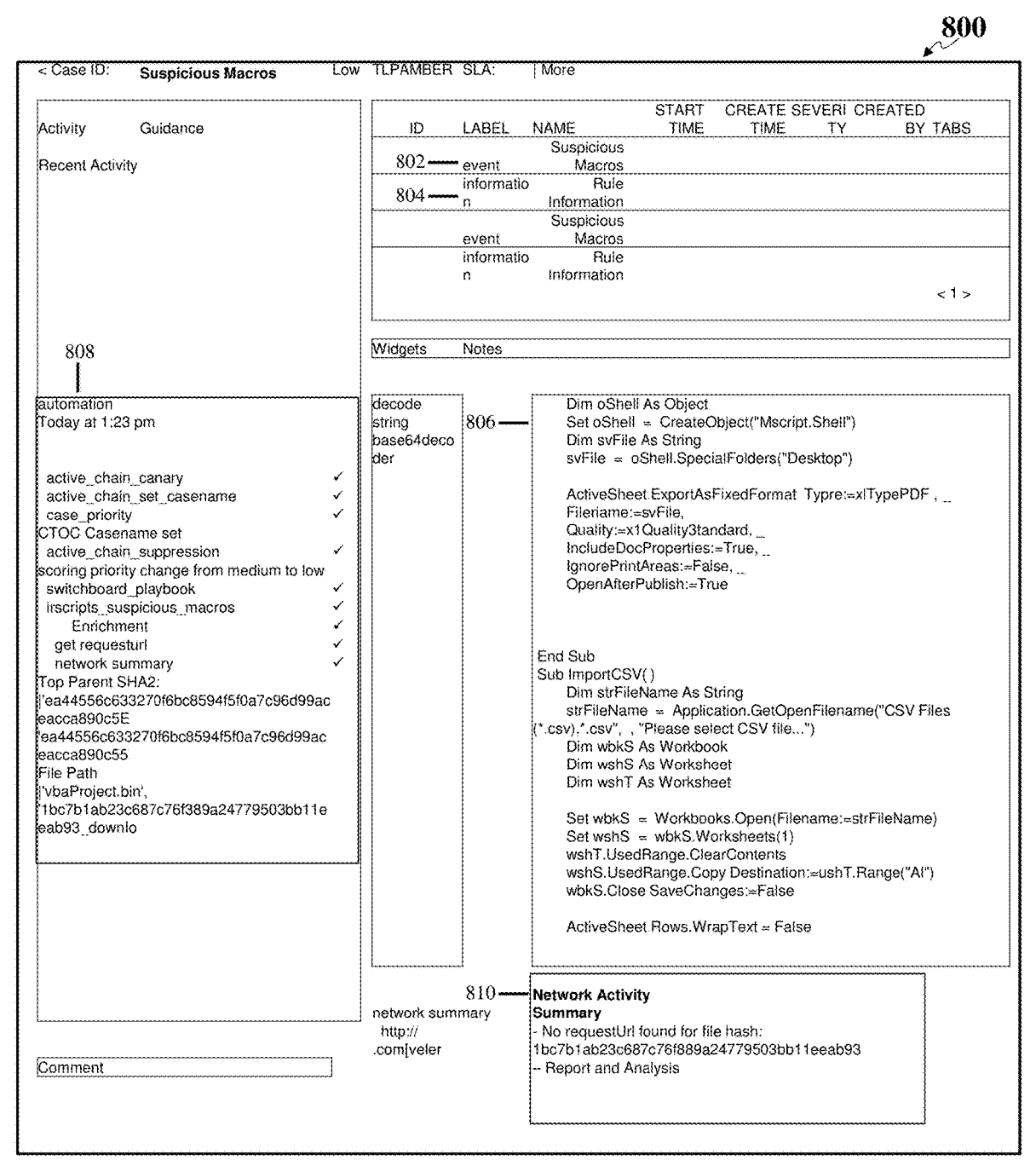

FIG. 8 illustrates an example of a graphical user interface 800 for managing the security information and event, according to an embodiment. The GUI 800 may show the alert content in the context of the security information and event management (SIEM) platform that aggregates all alerts from different sources. The SIEM platform may provide the analyst both insight into and a record of the activities within the monitored system. For example, the SIEM may analyze log and event data in real time to provide threat monitoring, event correlation, incident response and reports on network activity. Based on the type of received alerts, the SIEM may perform additional automation tasks or gather additional data and display the additional information. For example, the SIEM may receive alerts generated by the file scanner indicating a user downloaded a malicious document. The SIEM may find out what other users downloaded that malicious document. As a result, the SIEM may gather additional information that the file scanner is not necessarily aware of to provide additional context for the analyst.

The GUI 800 of the SIEM may include the alerts on suspicious macros from the file scanner. For example, the GUI 800 may include interactive elements "event" 802 and "information" 804 to provide information on the suspicious macros and the rules used to determine the suspicious behaviors. In addition, the GUI 800 may also include a text box 806 to display the decode string of the suspicious macros. As discussed above, the SIEM may perform additional automation tasks and gather additional data. The GUI 800 may display the additional information 808 generated by the SIEM performing the automation tasks. Such additional information may include active chain, case priority, enrichment, top parent, and other related information of the suspicious macros. Furthermore, the GUI 800 may include report on the network activity summary 810.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:
    intercepting, by a server, an electronic message configured to be transmitted from a first computer to a second computer within a private network, the electronic message comprising one or more electronic files;
    scanning, by the server, the electronic message in accordance with a first set of iterative scanning criteria and a second set of iterative scanning criteria, the first set of iterative scanning criteria comprising:
        identifying, by the server, an object interface embedded within or linked to a first electronic file from among the one or more electronic files;
        extracting, by the server, a second electronic file corresponding to the object interface, wherein the server iteratively performs a first set of iterative scanning where a number of iterations corresponds to a number of electronic files identified that are linked to or embedded within the first electronic file;
    the second set of iterative scanning criteria comprising:
        extracting, by the server, a first set of code scattered in the first electronic file and a second set of code scattered in the second electronic file;
        deobfuscating, by the server, the first and second sets of code by removing command string concatenations and decoding encoded strings;
        examining, by the server, the first and second deobfuscated sets of code by applying malicious behavior rules against the first and second deobfuscated sets of code while restricting the first and second sets of code being executed on the second computer or the server; and
        upon determining the first and second deobfuscated sets of code containing contents that match the malicious behavior rules, transmitting, by the server, the one or more electronic files to a malware repository.

2. The method of claim 1, further comprising:
    generating, by the server, alert notifications indicating the first and second electronic files are potentially malicious; and
    transmitting, by the server, the alert notifications to a computing device associated with an analyst.

3. The method of claim 2, wherein the alert notifications comprise alert identifiers, the potentially malicious electronic files, file paths of the potentially malicious electronic files, a deobfuscated set of code containing contents that match the malicious behavior rules, the malicious behavior rules applied to the first and second electronic files, and hierarchical relationships between the electronic files.

4. The method of claim 2, wherein the alert notifications are transmitted as email, instant message, text message, voicemail, or any other electronic messages.

5. The method of claim 1, further comprising:
    determining, by the server, a risk level for the first and second electronic files; and
    transmitting, by the server, alert notifications of the first and second electronic files based on the risk level.

6. The method of claim 1, further comprising:
    storing, by the server, the first and second electronic files into a malware repository off network for further investigation.

7. The method of claim 1, further comprising:
    updating, by the server, a malicious behavior database storing the malicious behavior rules with new malicious behavior rules based on new knowledge of malicious attacks.

8. The method of claim 1, further comprising:
    identifying and recording, by the server, a hierarchical relationship between the second electronic file and the first electronic file.

9. The method of claim 1, further comprising:
    extracting, by the server, objects and code from the first and second electronic files; and
    storing, by the server, the extracted objects and code into separate folders.

10. The method of claim 1, wherein the malicious behavior rules comprise rules defining Boolean statements, regular expressions, and statistical measures for malicious software detection.

\* \* \* \* \*